United States Patent Office 3,441,367
Patented Apr. 29, 1969

3,441,367
METHOD FOR SETTING FINISHES ON CELLU-
LOSIC TEXTILES WITH CATALYST COMPOSI-
TION OF MAGNESIUM HALIDE AND ORGANIC
ACID
Andrew G. Pierce, Jr., and John G. Frick, Jr., New
Orleans, La., assignors to the United States of America
as represented by the Secretary of Agriculture
No Drawing. Filed Dec. 22, 1965, Ser. No. 515,709
Int. Cl. D06m 13/14, 15/12
U.S. Cl. 8—116.3                         5 Claims

ABSTRACT OF THE DISCLOSURE

This invention relates to a mixed catalyst composition for setting crosslinking finishes on cellulosic fabrics. The mixed catalyst composition consists of magnesium chloride hexahydrate and a member selected from the group consisting of citric acid, tartaric acid, methoxyacetic acid, hydroxybutyric acid, and glycolic acid. The two constituents are operable in ratio mixtures of from 25 to 75 parts by weight of one to 75 to 25 parts by weight of the other.

---

A non-exclusive, irrevocable, royalty-free license in the invention herein described, throughout the world for all purposes of the United States Government, with the power to grant sublicenses for such purposes, is hereby granted to the Government of the United States of America.

This invention relates to catalyst compositions for setting finishes on cellulosic fibrous materials. More specifically, it deals with catalyst compositions having unexpected synergistic properties for setting crosslinking finishes on cellulosic fibrous materials. Still more specifically, it relates to catalyst compositions consisting of magnesium halides and hydroxy or alkoxy substituted carboxylic acids. Another object of our invention is to provide novel methods for improving the wrinkle resistance and smooth drying properties of cellulosic materials at lower temperatures and shorter heating periods.

The term "setting" as used herein relates to the reaction of a finishing agent with cellulose to provide wrinkle resistance and smooth drying properties to the cellulosic material.

The terms "cellulosic fibrous materials" includes natural or synthetic fibers, yarns, woven fabrics, or non-woven fabrics. Since the primary interest in cellulosic materials is "cotton," it will frequently be used below as illustrative of cellulosic fibrous materials.

Finishes are often applied to cellulosic fabrics to improve their resistance to wrinkling and their ability to dry smooth after laundering. The finishing processes usually consist in the application of a finishing agent and a catalyst to the fabric followed by drying the fabric and then heating the fabric to cure the finishing agent. The agents commonly used are formaldehyde and condensates of formaldehyde with organic amido compounds, such as urea, melamine, imidoazolidinone, and carbamates from which polymethylol derivatives are formed. Under the influence of the catalyst and heat these agents react with the cellulose of the fabric, or with themselves, to produce durable improvements in the wrinkle-resistance and smooth-drying properties of the fabric.

Acidic catalysts are usually required for these reactions. The catalyst, however, cannot be too acidic without causing the agents to react prematurely with themselves, or with the solvent before they are applied to the cellulosic fabric. Should this occur, the treatment would be ineffective. On the other hand, the acidity of the catalyst cannot be too low without requiring heating temperatures high enough to damage the cellulose, or an excessively long period of heating (curing). Also, the catalyst must not be lost by volatilization before the reactions on the fabric are complete. Catalysts in use meet these requirements to a greater or lesser extent. Among them are ammonium-, amine-, and metal-salts of inorganic acids, and organic acids.

We have now found that a particularly effective catalyst composition is formed for a mixture of a magnesium halide and a hydroxy, or alkoxy, substituted carboxylic acid, for instance magnesium chloride hexahydrate and citric acid in a ratio of from about 25 to 75 parts to about 75 to 25 parts, respectively, with the preferred ratio being about 40 to 60. Other magnesium halides and/or other hydroxy or alkoxy substituted acids may be substituted in these mixtures in molar equivalent amounts. By molar equivalent amounts is meant that the other halides used should be equivalent to the 25–75 parts magnesium chloride hexahydrate; and the other substituted carboxylic acids used should be equivalent to about 75–25 parts citric acid, parts being by weight. The hydroxy or alkoxy group is essential in the organic acid since acids such as citric, glycolic, hydroxybutyric, methoxyacetic and tartaric acids are very effective while acids that do not contain hydroxyl or alkoxyl groups, such as maleic and succinic acids, do not give compositions with exceptional catalytic action, i.e., do not show a synergistic effect.

Several catalyst compositions for setting finishes on cellulosic textile materials have been mentioned in previous patents. For example, Parsons and Mona (U.S. 3,090,665) describes and claims a mixed catalyst, but this composition was restricted to use with formaldehyde-hydrazide finishing agents. Hushebeck (U.S. 3,139,322) describes and claims a catalyst composition in which the metal salt component was not a halide, but rather a nitrate. Ryan and Taylor (U.S. 3,006,879) describes and claims a composition comprising a polybasic acid and an acid salt; however, most of the polybasic acids which they mentioned were either inorganic or carboxylic acids which were not hydroxy or alkoxy substituted. In addition, the metal salts mentioned were not halides, and the main object of the composed mixture in this last patent is the formation of a metal hydrogen salt, or metal acid salt, that serves as the actual catalyst. In none of the above mentioned patents is a synergistic effect noted, in which the mixture of components is more effective than either component used separately under the same conditions of treatment.

The exceptional effectiveness of these synergistic mixtures of magnesium halides and hydroxy acids or alkoxy acids gives the following advantages in the finishing of cellulosic textiles:

Lower temperatures or shorter heating periods can be used. This results in a savings in the cost of fuel. It also allows the use of smaller ovens or a faster production rate in the process.

Improved efficiency is obtained. A greater proportion of the agent or agents applied actively contributes to the changes in properties of the treated textile and a less proportion is inert because of incomplete reaction.

A broader field of finishing agents is made available. With the novel catalyst compositions of this invention, some finishing agents can now be used that could not be used previously with the less effective catalysts of the prior art. This can be important where it is necessary to avoid unwanted side effects that are produced in the finished textile by many of the presently available agents. Specifically, these catalyst compositions are effective with methylol derivatives of urea, ethyleneurea, dihydroxyethyleneurea, melamine, acetylenediurea, methyl carbamate, isopropyl carbamate, hydroxyethyl carbamate, methyoxyethyl carbamate, ethyl triazone, hydroxyethyl triazone, urone, and their ethers.

Optimum conditions for the use of the catalyst composition of this invention will vary according to the particular agent with which it is to be used and the equipment on which the fabric is to be treated. Ordinarily, it is used in a quantity to make 0.1 to 3.0 weight percent on the weight of the total solution of finishing agent applied to the fabric. After the fabric is impregnated and dried, a heating period, or cure time, for ½ to 3 minutes, at 100° to about 150° C. is required.

The following examples are submitted to illustrate in greater detail the process and results of this invention and are not be construed as limitations of the invention. The fabric used was 80 x 80 cotton printcloth which had been desized, scoured, and bleached.

Methods of testing

Bound formaldehyde was determined by the method of W. J. Roff—J. Textile Institute 47, T308 (1956).

Bound nitrogen was determined by the standard Kjeldahl method.

Dry crease recovery angle was determined by the ASTM method from Standards on Textile Materials, 1955, Philadelphia, Pa.

Wet crease recovery angles were determined by first soaking the finished fabric for five minutes at 150° F. in a 0.1 percent solution of a nonionic detergent, removing the excess solution by blotting, and then measuring the crease recovery angle by the method described above for dry crease recovery.

cal properties of the treated fabrics are given in the following Table.

TABLE I

| Catalyst | Cure Time | Percent Bound Formaldehyde | Wet CRA[1] Warp and Fill | Dry CRA[1] Warp and Fill |
|---|---|---|---|---|
| 2% MgCl$_2$·6H$_2$O | 3 Min | 0.82 | 251 | 258 |
| | 1 Min | 0.31 | 239 | 231 |
| 2% Citric Acid | 3 Min | 0.32 | 219 | 204 |
| | 1 Min | 0.12 | 206 | 187 |
| 2% Mixed Catalyst | 3 Min | 1.84 | 287 | 286 |
| 3 parts citric, 2 parts MgCl$_2$·6H$_2$O by Wt. | 1 Min | 1.74 | 287 | 288 |
| 1% MgCl$_2$·6H$_2$O | 3 Min | 0.73 | 230 | 243 |
| | 1 Min | 0.10 | 215 | 182 |
| 1% Mixed Catalyst | 3 Min | 1.53 | 285 | 282 |
| 3 parts citric, 2 parts MgCl$_2$·6H$_2$O (parts by wt.). | 1 Min | 1.15 | 266 | 286 |
| Untreated Control | | | 168 | 167 |

[1] CRA is crease recovery angle in degrees.

A scan be seen from the data, a synergistic effect is obtained with respect to both the crease recovery produced and the bound formaldehyde introduced, when a mixture of citric acid and magnesium chloride is used as the catalyst. This synergistic effect is not obtained when an equal quantity of either material is used separately as catalyst under the same set of conditions. Further, a cure time of one minute is as effective as three minutes when the mixture is used.

Example 2

In order to demonstrate the utility of these catalyst compositions with various finishing agents, the following example is submitted. Aqueous solutions containing various finishing agents and catalysts were prepared. The mixed catalyst referred to in the table is a mixture of citric acid and magnesium chloride hexahydrate in a ratio of 3 parts to 2 parts by weight. These solutions were applied to cotton printcloth in a manner similar to Example 1. The samples were dried for 7 minutes at 60° C. and cured for 3 minutes at 160° C., washed, and dried. Chemical and physical properties of the treated fabrics are given in the following table.

TABLE II

| Finishing Agent | Catalyst | Concentration of Catalyst Percent | Percent Bound Formaldehyde | Percent Bound Nitrogen | Dry CRA Warp and Fill° |
|---|---|---|---|---|---|
| 8% DMEU[1] | MgCl$_2$·6H$_2$O | 2.00 | 2.39 | 1.42 | 266 |
| 8% DMEU[1] | Citric Acid | 2.00 | 1.89 | 1.47 | 271 |
| 8% DMEU[1] | Mixed Cat. | 2.00 | 2.47 | 1.67 | 282 |
| 8% DMEU[1] | do | 1.25 | 2.24 | 1.79 | 302 |
| 8% DMEU[1] | do | 0.75 | 2.18 | 1.60 | 299 |
| 8% DMEU[1] | do | 0.50 | 2.25 | 1.56 | 290 |
| 8% DMEU[1] | do | 0.25 | 2.53 | 1.51 | 292 |
| 8% DMEU[1] | do | 0.13 | 2.51 | 1.60 | 274 |
| 7.3% DMMC[2] | do | 2.00 | | 0.67 | 281 |
| 7.3% DMMC[2] | do | 1.00 | | 0.67 | 281 |
| 7.3% DMMC[2] | do | 0.50 | | 0.60 | 281 |
| Untreated Control | | | | | 167 |

[1] Dimethylol ethyleneurea.
[2] Dimethylol methyl carbamate.

Example 1

Aqueous solutions were prepared, containing 8% formaldehyde and various amounts of catalysts. The mixed catalyst referred to in the Table I is a mixture of citric acid and magnesium chloride hexahydrate in a ratio of 3 parts to 2 parts by weight. Percent catalyst is based on the weight of the total solution. A laboratory padder was employed to apply these solutions to samples of cotton printcloth so that the padded samples had approximately 80–100% wet pickup. The samples were placed, at original dimensions on pin frames, in a forced draft oven and dried for 7 minutes at 60° C. The samples were then placed in a curing oven at 160° C. for various time intervals, then removed, washed, and dried. The physical and chemi- It will be observed that the mixed catalyst composition, when used with dimethylol ethyleneurea or dimethylol methyl carbarmate is effective in improving the crease recovery of the treated fabrics, even when used at greatly reduced concentrations. Ohter finishing agents for cellulose showing effective wrinkle resistance and smooth drying properties are methylol melamine, dimethylol ethyltriazone, and dimethylol hydroxyethyl carbamate.

Example 3

The use of these mixed catalyst compositions enables improved physical properties to be imparted to the treated fabric at curing tmeperatures considerably lower than usual and in curing times significantly shorter than usual. Samples of cotton printcloth were treated. The chemical and physical properties of the finished fabrics are shown in the following table. The mixed catalyst combination is the same as in Example 1.

TABLE III

| Finishing Agent | Catalyst | Cure Time (Min.) | Cure Temperature, Degrees C. | Percent Bound Formaldehyde | Percent Bound Nitrogen | Dry CRA Warp and Fill° |
|---|---|---|---|---|---|---|
| 8% CH₂O | 2% MgCl₂·6H₂O | 1 | 160 | 0.31 | | 231 |
| 8% CH₂O | 2% Mixed | 1 | 160 | 1.74 | | 288 |
| 8% CH₂O | 1% Mixed | 1 | 160 | 1.15 | | 286 |
| 8% CH₂O | do | 1 | 140 | 1.02 | | 267 |
| 8% CH₂O | do | 1 | 120 | 0.51 | | 239 |
| 8% CH₂O | 0.5 mixed | 1 | 160 | 0.90 | | 283 |
| 8% DMEU | 2% MgCl₂·6H₂O | 3 | 160 | 2.39 | 1.42 | 266 |
| 8% DMEU | 2% Mixed | 3 | 160 | 2.47 | 1.67 | 282 |
| 8% DMEU | do | 2 | 160 | 2.33 | 1.62 | 297 |
| 8% DMEU | do | 1 | 160 | 2.35 | 1.52 | 289 |
| 8% DMEU | do | ½ | 160 | 2.21 | 1.50 | 283 |
| 8% DMEU | do | 3 | 140 | 2.45 | 1.60 | 293 |
| 8% DMEU | do | 3 | 120 | 2.32 | 1.63 | 275 |
| 8% DMEU | do | 3 | 100 | 2.40 | 1.56 | 275 |
| 7.3% DMMC | 0.5% Mixed | 1 | 100 | | 0.71 | 272 |
| 7.3% DMMC | do | 3 | 120 | | 0.65 | 261 |
| Untreated Control | | | | | | 167 |

Example 4

These improved catalyst compositions of this invention may be combinations of magnesium halides other than the chloride and of carboxylic acids other than citric. However, it appears that the carboxylic acid must contain a hydroxyl or alkoxyl substituent. In order to demonstrate these features, the following example is submitted. Samples of cotton printcloth were treated in a manner similar to Example 1. The chemical and physical properties of the treated fabrics are given in the following table.

TABLE IV

| Finishing Agent | Catalyst | Cure Time Minutes | Cure Temperature, Degrees C. | Percent Bound Formaldehyde | Dry CRA Warp and Fill° |
|---|---|---|---|---|---|
| 8% CH₂O | 1% A | 1 | 140 | 1.02 | 267 |
| 8% CH₂O | 1% B | 1 | 140 | 0.23 | 188 |
| 8% CH₂O | 2% C | 3 | 160 | 0.24 | 198 |
| 8% CH₂O | 1% D | 1 | 160 | 1.18 | 301 |
| 8% CH₂O | 2% E | 15 | 60 | 0.12 | 223 |

NOTE:
A = 3/2 mixture of citric acid/magnesium chloride hexahydrate.
B = 36.9/40 mixture of succinic acid/magnesium chloride hexahydrate.
C = 0.8/1 mixture of valeric acid/magnesium chloride hexahydrate.
D = 53.1/40 mixture of tartaric acid/magnesium chloride hexahydrate.
E = 45/55 mixture of tartaric acid/magnesium iodide, sample dried and cured in one step.

Example 5

In order to demonstrate that alkoxy substituted acids may be used in these catalyst compositions, the following example is submitted. Samples of cotton printcloth were treated with aqueous solutions containing 10% DMEU and various catlysts in a manner similar to Example 1. The samples were dried for 7 minutes at 60° C. and cured for 3 minutes at 125° C. Physical and chemical properties of the treated fabrics are given in Table V.

TABLE V

| Catalyst | Percent Bound Formaldehyde | Percent Bound Nitrogen | Dry CRA Warp and Fill° |
|---|---|---|---|
| 1.36% MgCl₂·6H₂O | 1.62 | 1.05 | 245 |
| 1.36% Methoxyacetic Acid | 2.09 | 1.43 | 254 |
| 0.80% MgCl₂·6H₂O + 0.56% Methoxyacetic acid | 2.28 | 1.39 | 277 |
| Untreated Control | | | 167 |

Example 6

In order to demonstrate that the hydroxyl substituent on the organic acid does not necessarily have to be in the alpha position, the following example is submitted. Samples of cotton princloth were treated with aqueous solutions containing 10% DMEU and various catalysts in a manner similar to Example 1. The samples were dried for 7 minutes at 60° C. and cured for 3 minutes at 125° C. Physical and chemical properties of the treated fabrics are given in Table VI.

TABLE VI

| Catalyst | Percent Bound Formaldehyde | Percent Bound Nitrogen | Dry CRA Warp and Fill° |
|---|---|---|---|
| 1.45% MgCl₂·6H₂O | 1.64 | 1.00 | 240 |
| 1.45% 3-hydroxybutyric acid | 0.95 | 0.67 | 191 |
| 0.80% MgCl₂·6H₂O + 0.65% 3-hydroxybutyric acid | 2.21 | 1.36 | 269 |
| Untreated Control | | | 167 |

We claim:
1. A method for finishing a cellulosic fibrous material to improve its resistance to wrinkling and its smooth-drying properties after laundering comprising treating the cellulosic fibrous material with an aqeous solution containing (a) about from 4 to 12 weight percent of a finishing agent selected from the group consisting of formaldehyde and a water-soluble formaldehyde-amide condensate, and (b) a catalyst comprising about from 25 to 75 parts by weight of a magnesium halide and about from 75 to 25 parts by weight of an acid selected from the group consisting of citric acid, tartaric acid, methoxyacetate acid, hydroxybutyric acid, and glycolic acid, said catalyst being present in the amount of about from 0.1 to 3.0 weight percent of the aqueous solution, drying the thus-treated cellulosic fibrous material, and heating it at a temperature of about from 100° C. to 150° C. for about from ½ minute to 3 minutes to cure it.

2. The process of claim 1 wherein the cellulosic fibrous material is woven.

3. The process of claim 1 wherein the cellulosic fibrous material is nonwoven.

4. The process of claim 1 wherein the formaldehyde-amide condensate is a member selected from the group consisting of dimethylol ethylene urea, dimethylol methyl carbamate, methylol melamine, dimehtylol ethyltriazone, and dimethylol hydroxyethyl carbamate.

5. The process of claim 1 wherein the catalyst consists of about 40 parts by weight of magnesium chloride hexahydrate and about 60 parts by weight of the acid.

References Cited

UNITED STATES PATENTS 3,183,054   5/1965   Fischer et al. _____ 8—94.33

LEON D. ROSDOL, *Primary Examiner.*

J. D. WELSH, *Assistant Examiner.*

U.S. Cl. X.R.

252—429